(12) United States Patent
Tsai et al.

(10) Patent No.: US 11,194,239 B2
(45) Date of Patent: Dec. 7, 2021

(54) WAVELENGTH CONVERSION MODULE AND PROJECTION DEVICE

(71) Applicant: Coretronic Corporation, Hsin-Chu (TW)

(72) Inventors: Chia-Lun Tsai, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/879,752

(22) Filed: May 20, 2020

(65) Prior Publication Data

US 2020/0371414 A1 Nov. 26, 2020

(30) Foreign Application Priority Data

May 24, 2019 (CN) .......................... 201920757029.2

(51) Int. Cl.
*G03B 21/20* (2006.01)
*H04N 9/31* (2006.01)

(52) U.S. Cl.
CPC ......... *G03B 21/204* (2013.01); *G03B 21/208* (2013.01); *G03B 21/2066* (2013.01)

(58) Field of Classification Search
CPC .. G03B 21/204; G03B 21/2066; G03B 21/16; H04N 9/3161
See application file for complete search history.

(56) References Cited

U.S. PATENT DOCUMENTS

| 9,942,528 B2 | 4/2018 | Akiyama | |
|---|---|---|---|
| 2017/0180686 A1 | 6/2017 | Chen | |
| 2019/0331989 A1* | 10/2019 | Chen | G03B 33/08 |
| 2020/0348585 A1* | 11/2020 | Hsieh | G03B 21/2033 |

FOREIGN PATENT DOCUMENTS

| CN | 106896631 | 11/2018 |
|---|---|---|
| CN | 210052008 | 2/2020 |

* cited by examiner

*Primary Examiner* — Ryan D Howard
(74) *Attorney, Agent, or Firm* — JCIPRNET

(57) ABSTRACT

A wavelength conversion module and a projection device are provided. The wavelength conversion module includes a substrate, a wavelength conversion layer, a first reflective layer, and a second reflective layer. The substrate includes a first region and a second region. The wavelength conversion layer is disposed on the substrate. The first reflective layer is disposed on the first region of the substrate and located between the first region of the substrate and the wavelength conversion layer. The second reflective layer is disposed on the second region of the substrate and located between the second region of the substrate and the wavelength conversion layer, and a distance from a top surface of the second reflective layer to the substrate is shorter than a distance from a top surface of the first reflective layer to the substrate. The projection device includes an illumination system including the wavelength conversion module.

25 Claims, 8 Drawing Sheets

WAVELENGTH CONVERSION MODULE AND PROJECTION DEVICE

CROSS-REFERENCE TO RELATED APPLICATION

This application claims the priority benefit of China application serial no. 201920757029.2, filed on May 24, 2019. The entirety of the above-mentioned patent application is hereby incorporated by reference herein and made a part of this specification.

BACKGROUND

Technical Field

The invention relates to an optical module and an optical device, and in particular, to a wavelength conversion module and a projection device.

Description of Related Art

Projection devices including solid-state light sources such as light-emitting diodes (LEDs) and laser diodes have been recently drawing more and more attention in the market. Since the laser diodes have a luminous efficiency higher than about 20%, a technology of combing phosphor with a laser light source to form a solid color light source used for a projector has been under progressive development.

In general, a phosphor wheel includes a substrate, a wavelength conversion layer and a reflective layer. The wavelength conversion layer may be formed by applying phosphor mixed with silicone onto the substrate. However, such a wavelength conversion layer made of phosphor mixed with silicone may, for example, not be effectively resistant to a high temperature and may be easily deteriorated. After a long time of working, the silicone may be deteriorated or be burned out. Thus, the luminous efficiency and reliability of the phosphor wheel may be affected.

The reflective layer of a phosphor wheel may be produced in two modes. In one of the modes, a reflective layer is formed by coating a silver film, an aluminum film, a dielectric film, or a mixed stacking thereof on a substrate in vacuum. Such a reflective layer may have the advantages of high temperature resistance and fast heat conduction. However, since the reflective layer may preset different reflectances for color light beams of different wavebands, it is difficult to achieve a favorable reflection effect across various color lights at the same time. In the other mode, a reflective layer is formed by mixing diffuse reflection particles with silicone and then coating the mixture on the substrate by ways of printing, spraying and dispensing, etc. The silicone contained in such a reflective layer may have a risk of being not resistant to a high temperature and being easily deteriorated or burned out.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a wavelength conversion module, which has good conversion efficiency and reliability.

The invention provides a projection device, which has good conversion efficiency and reliability.

Other objectives and advantages of the invention may be further understood from the technical features disclosed in the invention.

In order to achieve one, some, or all of the aforementioned objectives or other objectives, an embodiment of the invention provides a wavelength conversion module. The wavelength conversion module includes a substrate, a wavelength conversion layer, a first reflective layer, and a second reflective layer. The substrate includes a first region and a second region. The wavelength conversion layer is disposed on the substrate. The first reflective layer is disposed on the first region of the substrate, and the first reflective layer is located between the first region of the substrate and the wavelength conversion layer. The second reflective layer is disposed on the second region of the substrate, and the second reflective layer is located between the second region of the substrate and the wavelength conversion layer. A distance from a top surface of the second reflective layer to the substrate is shorter than a distance from a top surface of the first reflective layer to the substrate.

In order to achieve one, some, or all of the aforementioned objectives or other objectives, an embodiment of the invention provides a projection device. The projection device includes an illumination system, a light valve and a projection lens. The illumination system is configured to provide an illumination beam, and includes an excitation light source, the wavelength conversion module and a filter module. The excitation light source may emit an excitation beam, and the wavelength conversion module is located on a transmission path of the excitation beam, and configured to convert the excitation beam into at least one converted beam. The filter module is located on a transmission path of the excitation beam and the at least one converted beam. The illumination beam includes the excitation beam and the at least one converted beam. The light valve is located on a transmission path of the illumination beam and may convert the illumination beam into an image beam. The projection lens is located on a transmission path of the image beam and may project the image beam.

Based on the foregoing, the embodiments of the invention may have at least one of the following advantages or effects. In the projection device and the wavelength conversion module, the first reflective layer and the second reflective layer are disposed at different regions distinctively or compositely, so that different reflection structures may be used for various excitation beams of different energy intensities. With such a reflection configuration, deterioration or burn-out caused from a high temperature may be effectively avoided, and the conversion efficiency and reliability of the wavelength conversion module and the projection device may also not be compromised.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
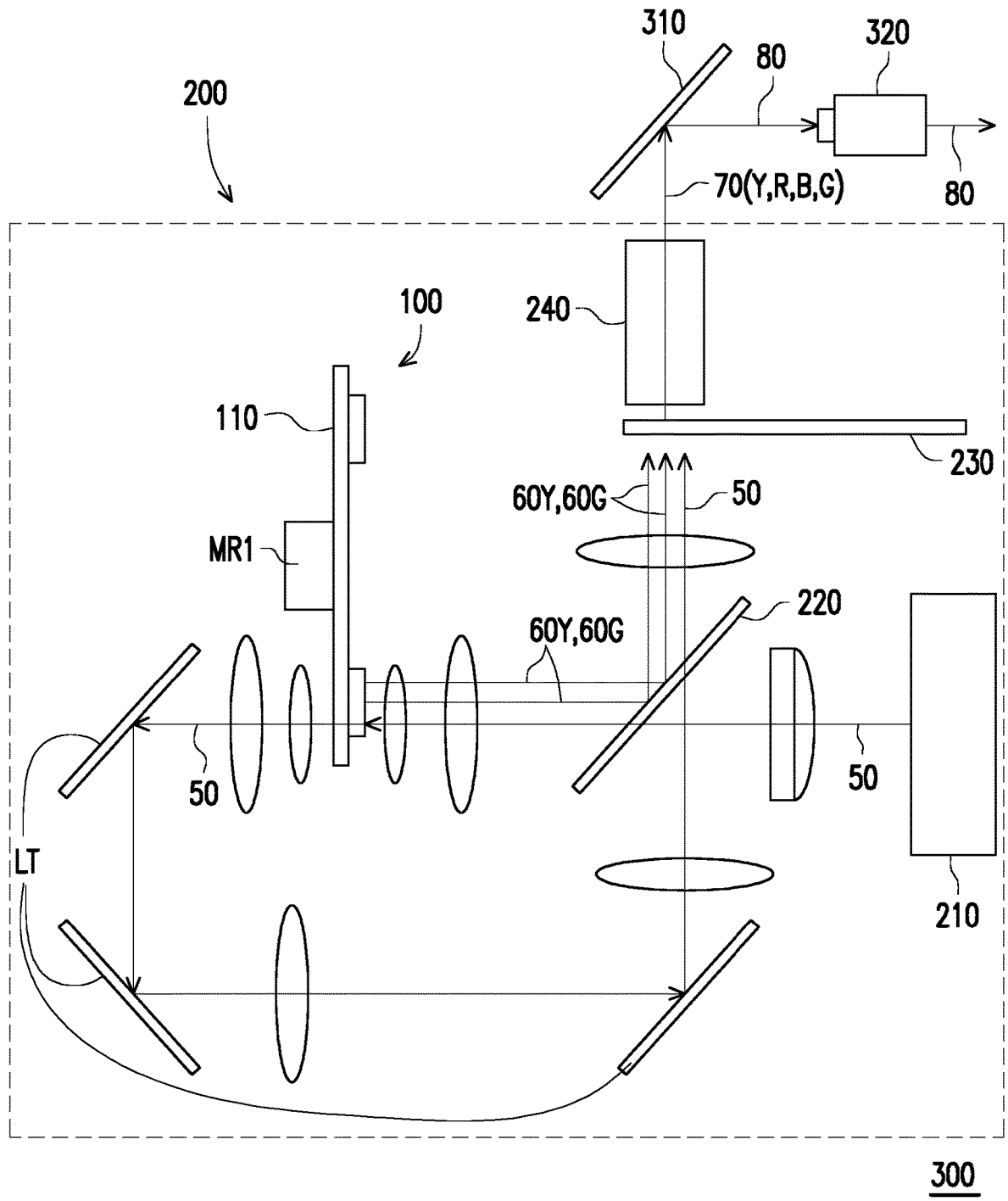
FIG. 1 is a schematic structural view of a projection device according to an embodiment of the invention.

FIG. 1 is a schematic structural view of a projection device according to an embodiment of the invention. Referring to FIG. 1, in the embodiment, the projection device 300 includes an illumination system 200, a light valve 310 and a projection lens 320. The illumination system 200 is configured to provide an illumination beam 70. The light valve 310 is located on a transmission path of the illumination beam 70 and may be configured to convert the illumination beam 70 into an image beam 80. The projection lens 320 is located on a transmission path of the image beam 80 and may be configured to project the image beam 80 onto a screen (not shown) to form an image picture. Since the illumination beam 70 is emitted into the light valve 310 and converted by the light valve 310 into the image beams 80 of different colors in a timing manner, a color picture may be formed on the screen by the image beam 80 projected by the projection lens 320. For example, in the embodiment, the light valve 310 includes, for example, a digital micro-mirror device (DMD) or a liquid-crystal-on-silicon (LCOS) panel. However, in other embodiments, the light valve 310 may also be a penetrative liquid crystal panel or another beam modulator. For example, in the embodiment, the projection lens 320 may include one or more lenses.

As shown in FIG. 1, in the embodiment, the illumination system 200 includes an excitation light source 210, a beam splitter 220, a wavelength conversion module 100, and a filter module 230. The excitation light source 210 may emit an excitation beam 50. In the embodiment, the excitation light source 210 is a laser light source, and the excitation beam 50 is a blue laser beam. For example, the excitation light source 210 may include single or multiple arrayed blue laser diodes (not shown), but the invention is not limited thereto.

As shown in FIG. 1, in the embodiment, the beam splitter 220 is disposed on a transmission path of the excitation beam 50 and located between the excitation light source 210 and the wavelength conversion module 100. Specifically, the beam splitter 220 may be a partially-penetrative and partially-reflective element, a dichroic mirror, a polarizing beam splitting element, or other various elements that may be configured to split beams. For example, in the embodiment, the beam splitter 220 may, for example, allow a blue band beam to penetrate while reflecting beams of other color (e.g., red, green, yellow, etc.). That is to say, the beam splitter 220 may allow a blue excitation beam 50 to penetrate, and thus, the excitation beam 50 may penetrate the beam splitter 220 and may be transmitted and emitted into the wavelength conversion module 100.

The wavelength conversion module 100 of this embodiment will be further explained below with reference to FIG. 2A to FIG. 2H.

Figure 2A:
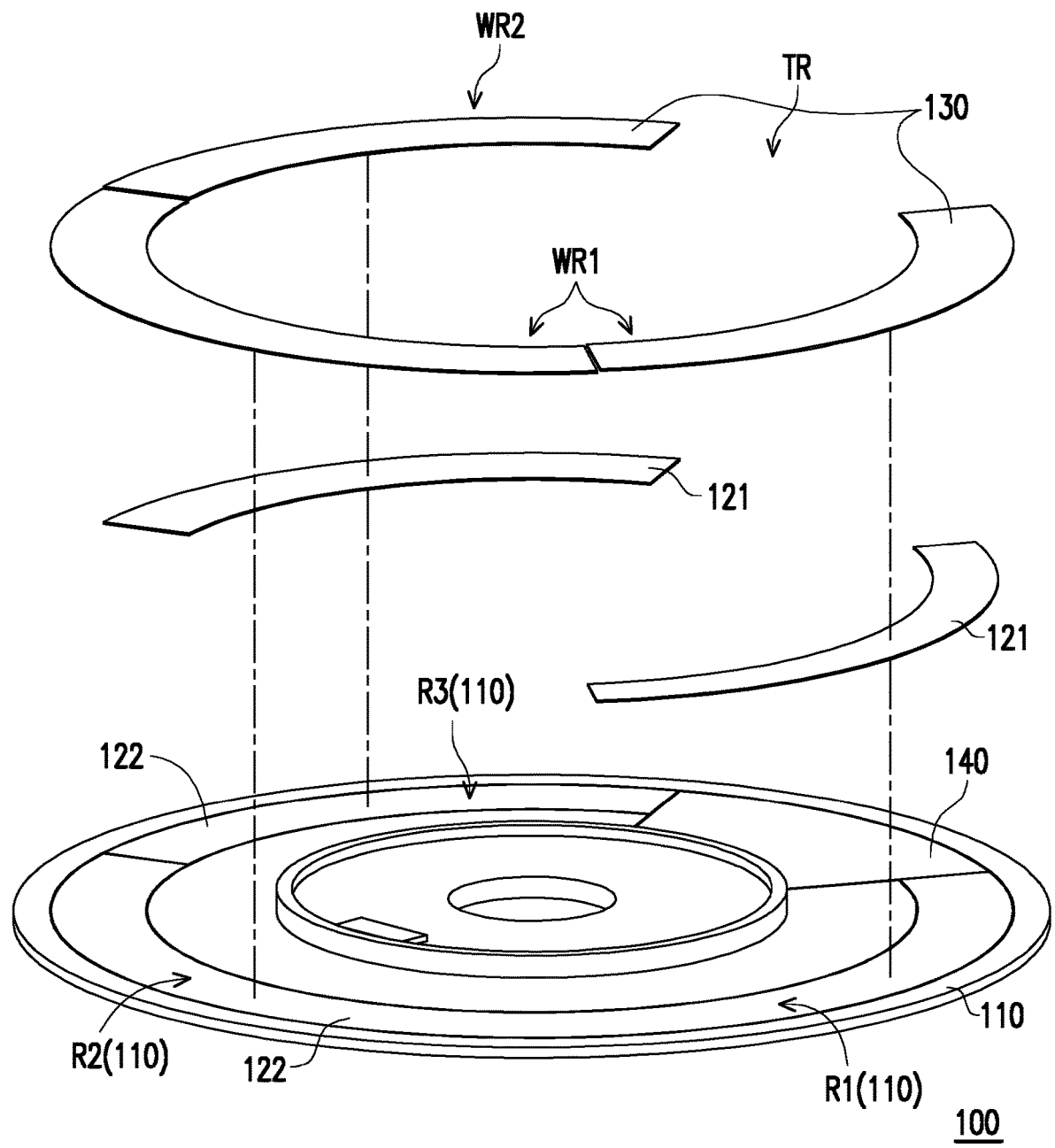
FIG. 2A is a schematically exploded view of a wavelength conversion module of FIG. 1.
Figure 2B:
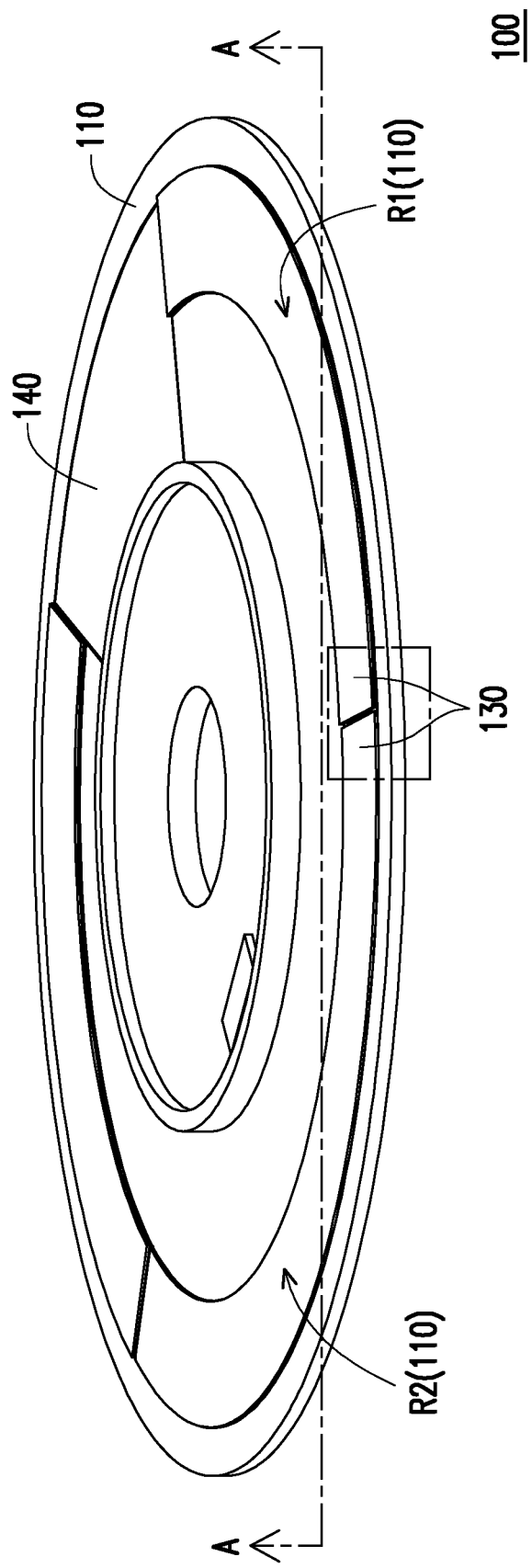
FIG. 2B is a schematic view of a perspective of the wavelength conversion module of FIG. 2A.
Figure 2C:
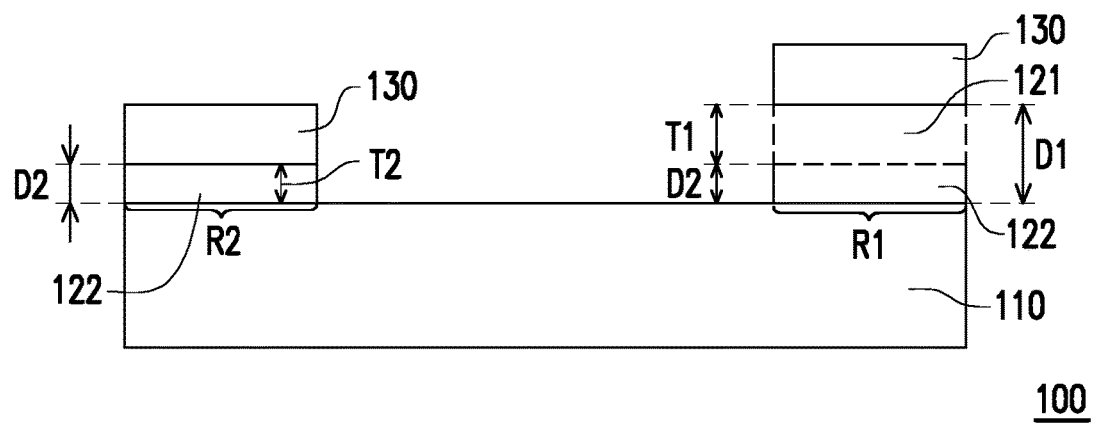
FIG. 2C is a schematically sectional view of the wavelength conversion module of FIG. 2B along a line A-A.
Figure 2D:
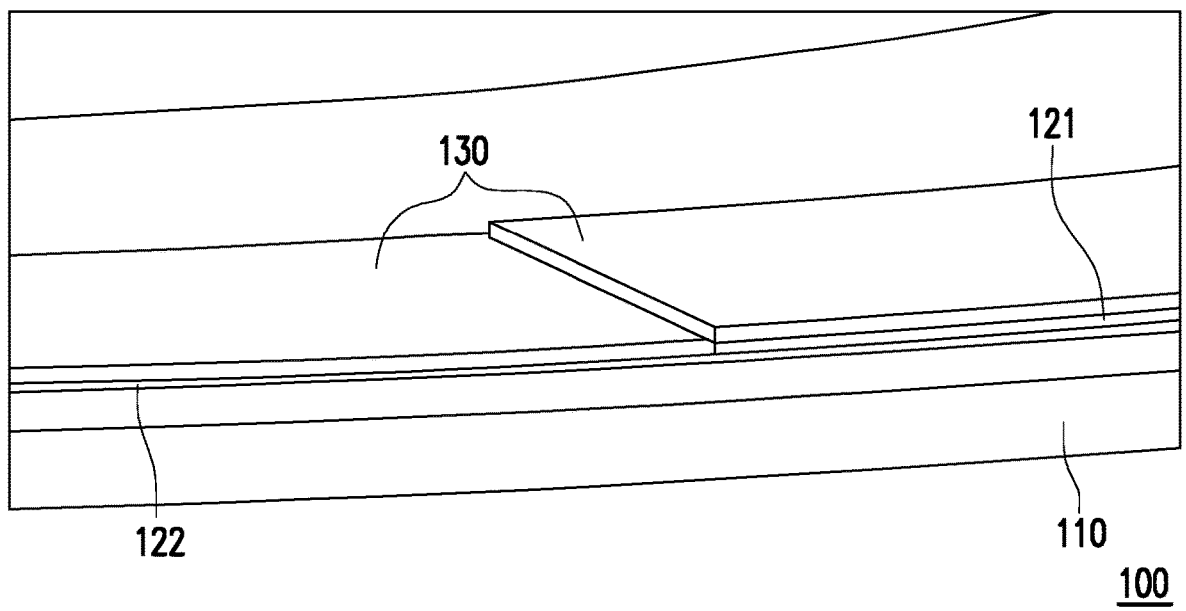
FIG. 2D is a schematically enlarged view of a partial region of the wavelength conversion module of FIG. 2B.

FIG. 2A is a schematically exploded view of a wavelength conversion module of FIG. 1. FIG. 2B is a schematic view of a perspective of the wavelength conversion module of FIG. 2A. FIG. 2C is a schematically sectional view of the wavelength conversion module of FIG. 2B along a line A-A. FIG. 2D is a schematically enlarged view of a partial region R of the wavelength conversion module of FIG. 2B. Specifically, as shown in FIG. 1, in the embodiment, the wavelength conversion module 100 is located on the transmission path of the excitation beam 50. As shown in FIG. 2A to FIG. 2B, in the embodiment, a wavelength conversion layer 130 includes a first wavelength conversion region WR1, a second wavelength conversion region WR2 and a passing-through region TR. For example, the first wavelength conversion region WR1 and the second wavelength conversion region WR2 of the wavelength conversion module 100 may respectively convert the excitation beam 50 into a converted beam 60Y and a converted beam 60G, and the passing-through region TR of the wavelength conversion module 100 allows the excitation beam 50 to pass through. The excitation beam 50 passing through the passing-through region TR may then be transmitted to a subsequent optical element.

Further, as shown in FIG. 2A to FIG. 2C, in the embodiment, the wavelength conversion module 100 includes a substrate 110, the wavelength conversion layer 130, a first reflective layer 121, and a second reflective layer 122. The substrate 110 includes a first region R1 and a second region R2. The first region R1 and the second region R2 correspond to the first wavelength conversion region WR1. The wavelength conversion layer 130 is disposed on the substrate 110, and includes a first wavelength conversion material and a second wavelength conversion material. The first wavelength conversion material is correspondingly disposed on the first region R1 of the substrate 110, and the second wavelength conversion material is correspondingly disposed on the second region R2 of the substrate 110. In other words, both the first wavelength conversion material and the second wavelength conversion material are located in the first wavelength conversion region WR1, and correspond to the first region R1 and the second region R2 of the substrate 110, respectively. In addition, in the embodiment, the wavelength conversion layer 130 further includes a third wavelength conversion material located in the second wavelength conversion region WR2. The substrate 100 further includes a third region R3, and the third wavelength conversion material is correspondingly disposed on the third region R3 of the substrate 110. For example, in the embodiment, the first wavelength conversion material and the second wavelength conversion material are phosphors that may be excited to generate yellow light. The third wavelength conversion material may include a phosphor that may be excited to generate green light. In other words, the converted beam 60Y may be yellow light, and the converted beam 60G may be green light.

In the embodiment, the first wavelength conversion material and the second wavelength conversion material may be different or not. When the first wavelength conversion material is different from the second wavelength conversion material, the converted beams 60Y converted by the first wavelength conversion material and the second wavelength conversion material are yellow light, while the dominant wavelength of the color light formed from the first wavelength conversion material is different from the dominant wavelength of the color light formed from the second wavelength conversion material. Thus, the color of the subsequently formed illumination beam 70 can be further adjusted as required by various combination of the first wavelength conversion material and the second wavelength conversion material.

As shown in FIG. 2A to FIG. 2D, in the embodiment, the first reflective layer 121 is disposed on the first region R1 of the substrate 110, and the first reflective layer 121 is located between the first region R1 of the substrate 110 and the wavelength conversion layer 130. The second reflective layer 122 is disposed on the second region R2 of the substrate 110, and the second reflective layer 122 is located between the second region R2 of the substrate 110 and the wavelength conversion layer 130. In detail, as shown in FIG. 2C to FIG. 2D, in the embodiment, a distance D2 from a top surface of the second reflective layer 122 in the second region R2 to the substrate 110 is shorter than a distance D1 from a top surface of the first reflective layer 121 in the first region R1 to the substrate 110. Specifically, as shown in FIG. 2C, in the embodiment, a thickness T2 of the second reflective layer 122 in the second region R2 is less than a thickness T1 of the first reflective layer 121 in the first region R1. As shown in FIG. 2C, in the embodiment or other embodiments, the second reflective layer 122 may be also selectively disposed on the first region R111 of the substrate 110. Therefore, the second reflective layer 122 may be also located between the first region R1 of the substrate 110 and the first reflective layer 121. However, the invention does not limit the range of the second reflective layer 122 as long as the distance D2 from the top surface of the second reflective layer 122 on the second region R2 of the substrate 110 to the substrate 110 is shorter than the distance D1 from the top surface of the first reflective layer 121 (in the first region R1) to the substrate 110. Thus, the wavelength conversion layer 130 on the second region R2 of the substrate 110 is closer to the substrate 110, and the heat generated from the wavelength conversion layer 130 may be quickly conducted to the substrate 110, thereby achieving a higher temperature resistance and a faster heat conduction. In this embodiment, the wavelength conversion layer 130 located in the first region R1 and the wavelength conversion layer located in the second region R2 may be located on different planes. However, the invention is not limited thereto. In other embodiments, the wavelength conversion layer 130 located in the first region R1 and the wavelength conversion layer located in the second region R2 may be located on the same plane. In another embodiment, as shown in FIG. 2A, the first reflective layer 121 and/or the second reflective layer 122 may be disposed between the third region R3 of the substrate 110 and the second wavelength conversion region WR2 of the wavelength conversion layer 130.

For example, in the embodiment, the first reflective layer 121 is a diffuse reflection layer, and the second reflective layer 122 is a specular reflection layer. In the embodiment, the diffuse reflection layer may be a reflective layer mixed with white scattering particles and a bonding material. For example, the material of the scattering particles may include titanium dioxide ($TiO_2$), silicon dioxide ($SiO_2$), aluminum oxide ($Al_2O_3$), boron nitride (BN), or zirconium dioxide ($ZrO_2$). The material of the bonding material may include silicone, but the invention is not limited thereto. The specular reflection layer may be a metal layer with a protective layer or a dielectric layer coated on the surface of the substrate 110, and the material thereof may include silver or aluminum, but the invention is not limited thereto.

Figure 2E:
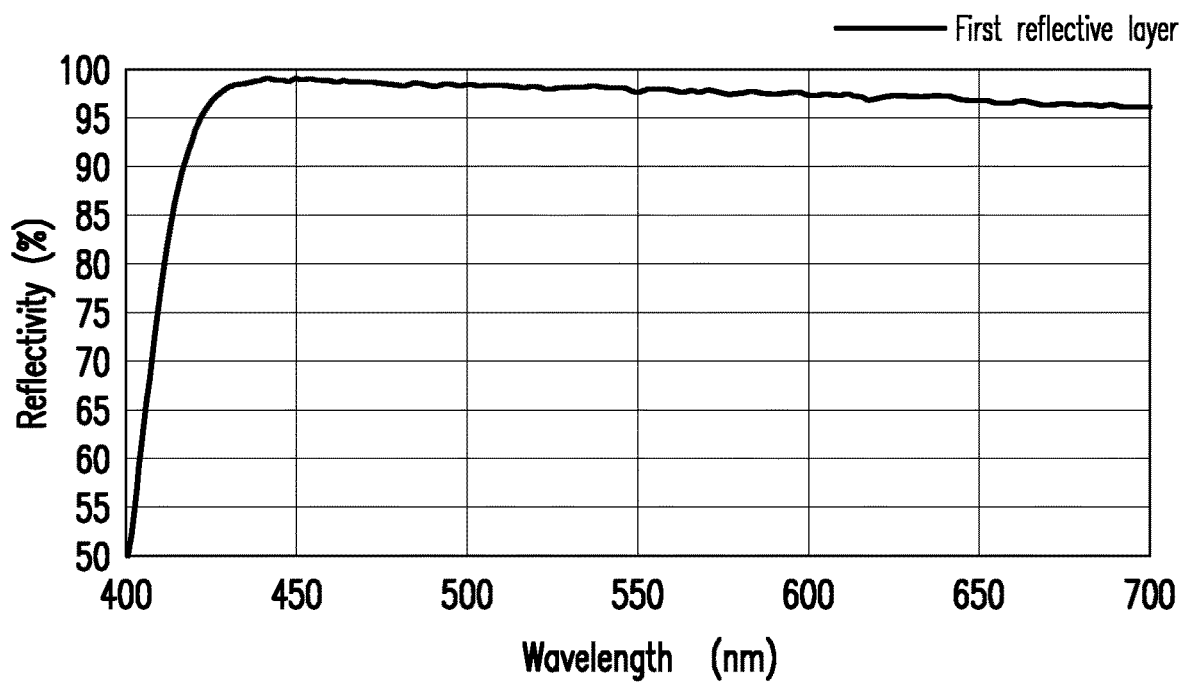
FIG. 2E schematically shows the reflectivity of the first reflective layer of FIG. 2D for light beams ranging within a wavelength band.
Figure 2F:
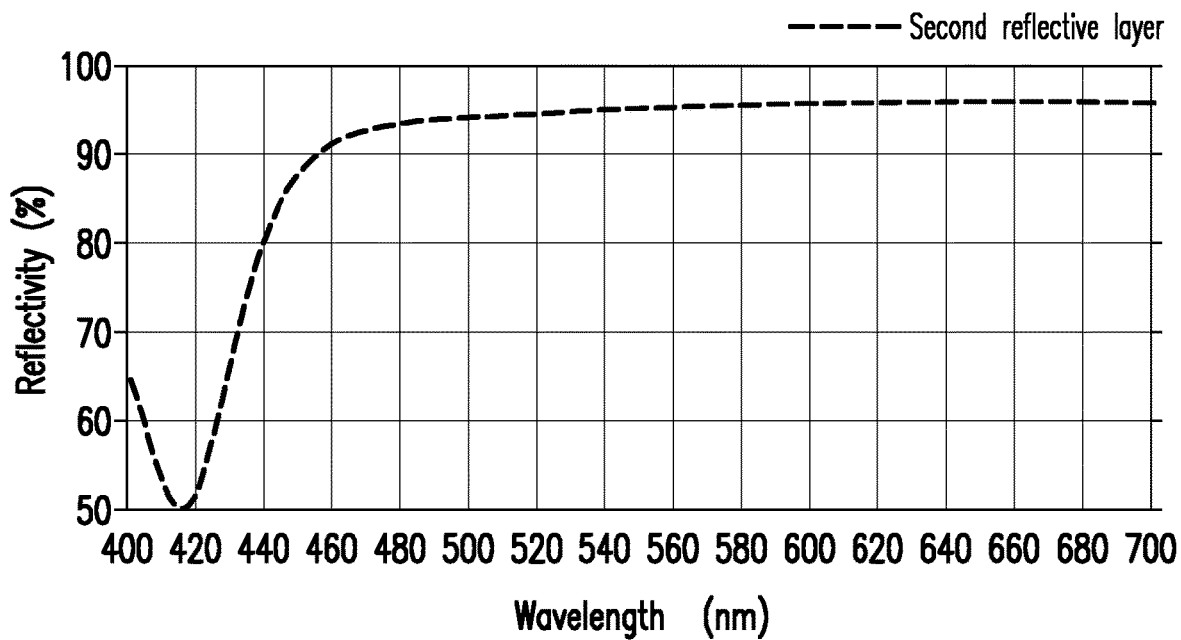
FIG. 2F schematically shows the reflectivity of the second reflective layer of FIG. 2D for light beams ranging within a wavelength band.

FIG. 2E schematically shows the reflectivity of the first reflective layer of FIG. 2D for light beams ranging within a wavelength band. FIG. 2F schematically shows the reflectivity of the second reflective layer of FIG. 2D for light beams ranging within a wavelength band. As shown in FIG. 2E to FIG. 2F, in the embodiment, a first reflection spectrum of the first reflective layer 121 for a light beam ranging within a specific wavelength band is different from a second reflection spectrum of the second reflective layer 122 for the light beam ranging within the specific wavelength band. As shown in FIG. 2E, the first reflective layer 121 may have an optimal reflection effect for various color lights. As shown in FIG. 2F, the second reflective layer 122 may have a favorable reflection effect on a long-wavelength light beam.

In this way, the wavelength conversion layer 130 located on the second region R2 of the substrate 110 may exhibit a higher heat resistance and a faster heat conduction, and the conversion efficiency for long-wavelength light beams and the reliability not be compromised. With the arrangement of the first reflective layer 121, the wavelength conversion layer 130 located on the first region R1 of the substrate 110 may maintain the conversion efficiency for various color light beams of different wavelengths.

Figure 2G:
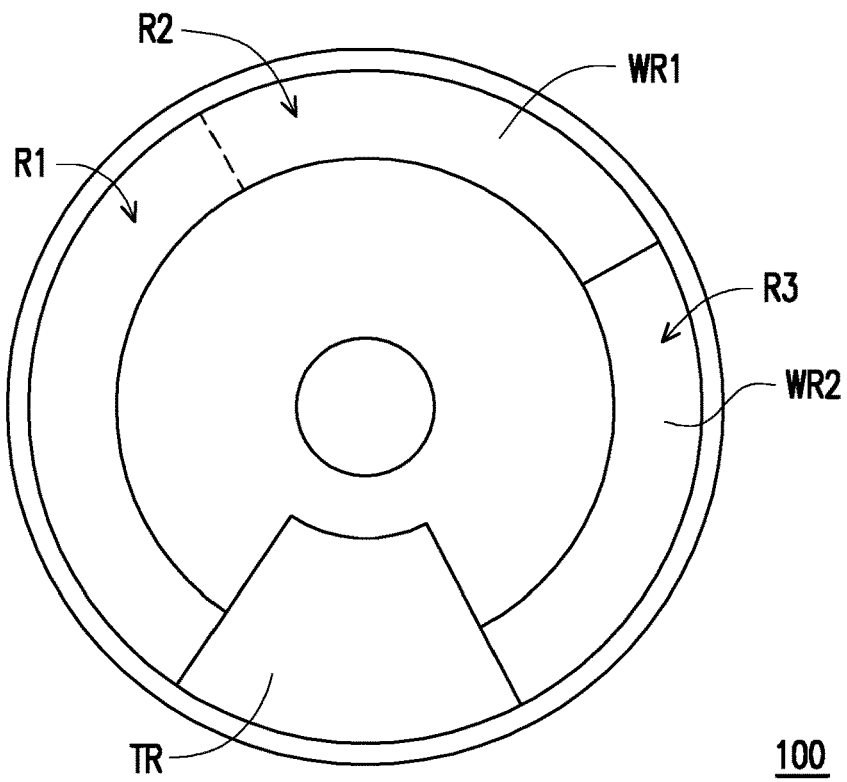
FIG. 2G is a schematic front view of the wavelength conversion module of FIG. 2A.
Figure 2H:
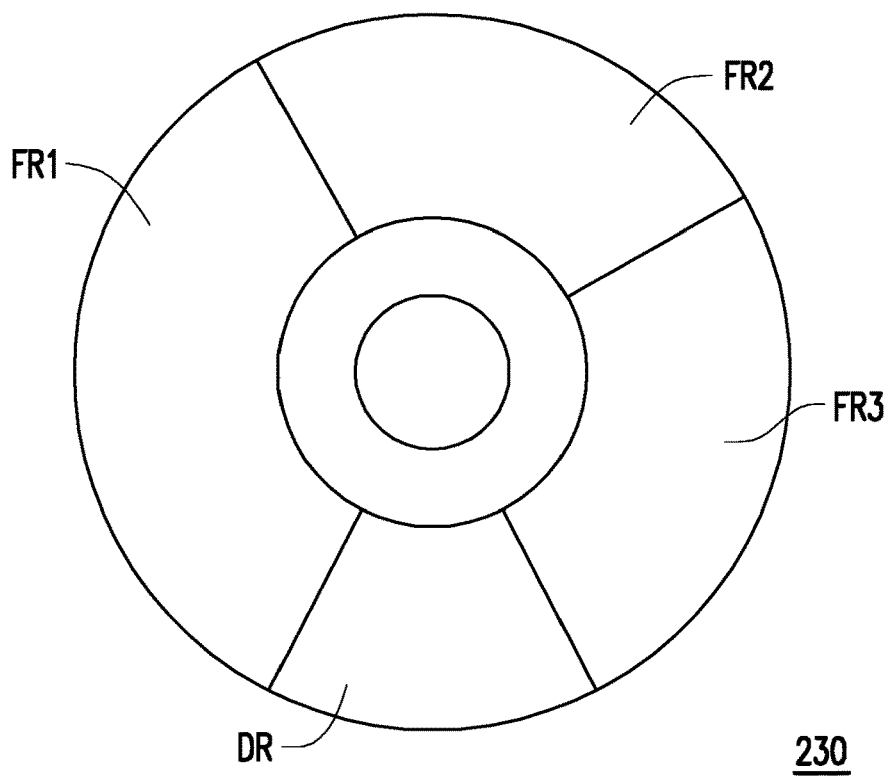
FIG. 2H is a schematic front view of a filter module of FIG. 1.

FIG. 2G is a schematic front view of the wavelength conversion module 100 of FIG. 2A. FIG. 2H is a schematic front view of the filter module 230 of FIG. 1. On the other hand, as shown in FIG. 2A to FIG. 2B, in the embodiment, the substrate 110 of the wavelength conversion module 100 may include a hollowed region (not numbered), which is positioned corresponding to the passing-through region TR, and the wavelength conversion module 100 further may include a diffusion piece 140, which is positioned corresponding to the passing-through region TR and the hollowed region (not numbered) of the substrate 110. That is to say, in the embodiment, the wavelength conversion module 100 may be a penetrative wavelength conversion module 100, and the passing-through region TR may allow penetration of the excitation beam 50.

As such, referring to FIG. 1 again, in the embodiment, the wavelength conversion module 100 further includes a first driving device MR1, and the first driving device MR1 may be used for driving the passing-through region TR and the at least one wavelength conversion region WR to rotate so that they may enter an illumination range of the excitation beam 50 at different times. Therefore, the excitation beam 50 may selectively pass through the passing-through region TR or be converted into the converted beams 60Y, 60G. As shown in FIG. 1, in the embodiment, when the passing-through region TR of the wavelength conversion module 100 enters the illumination range of the excitation beam 50, the excitation beam 50 penetrates the wavelength conversion module 100 and is transmitted to the filter module 230 via a light transmission module LT. On the other hand, in the embodiment, when the wavelength conversion region WR1 or the wavelength conversion region WR2 enters the irradiation range of the excitation beam 50, the excitation beam 50 may be converted into the converted beams 60Y, 60G by the wavelength conversion region WR1 or the wavelength conversion region WR2. Thereafter, as shown in FIG. 1, at least one of the converted beams 60Y, 60G from the wavelength conversion module 100 may be guided to the beam splitter 220 and reflected to the subsequent filter module 230.

Specifically, as shown in FIG. 1 and FIG. 2H, the filter module 230 may be located on the transmission path of the excitation beam 50 and the converted beams 60Y, 60G, and the filter module 230 may have a first filter region FR1, a second filter region FR2, a third filter region FR3, and a diffusion region DR. The filter module 230 further includes a second driving device (not shown), which may be used to drive the first filter region FR1 and the second filter region FR2 to rotate, such that they may enter the illumination range of the converted beams 60Y, 60G correspondingly at different times to respectively form color lights of different colors. In detail, the converted beam from the first wavelength conversion material in the first wavelength conversion region WR1 may pass through the first filter region FR1 and a first color light beam Y may be formed, the converted beam from the second wavelength conversion material in the first wavelength conversion region WR1 may pass through the second filter region FR2 and a second color light beam R may be formed, and the converted beam from the third wavelength conversion material in the second wavelength conversion region WR2 may pass through the third filter region FR3 and a fourth color light beam G may be formed. The diffusion region DR may periodically enter the illumination range of the excitation beam 50, and the diffused excitation beam 50 may then be transmitted to the filter module 230 at different times and a third color light beam B may be formed. In the embodiment, for example, the first color light Y may be yellow light, the second color light R may be red light, the fourth color light G may be green light, and the third color light B may be blue light. The illumination beam 70 may include the first color light Y, the second color light R, the third color light B, and the fourth color light G. As such, the excitation beam 50 and the converted beams 60Y, 60G may be converted sequentially into the illumination beam 70 of a plurality of different colors.

In this way, since the filter module 230 may filter out a part of the converted beam 60Y and the second color light R may thus be formed, the conversion efficiency of the second color light R may be relatively reduced with respect to the first color light Y. In order to maintain the second color light R at a certain proportion, the wavelength conversion layer 130 located on the second region R2 may excited by an excitation beam 50 with a higher intensity to generate a converted beam 60Y with a sufficient brightness, such that the intensity and proportion of the second color light R in the illumination beam 70 may be maintained. In the embodiment, it may be appreciated that the driving current for the excitation light source 210 may be adjusted with time to generate excitation beams 50 of different intensities, so that intensities of various color lights beams may be adjusted and combined to form different and desirable colorful beams for a desired colorful picture.

With the second reflective layer 122 arranged on the second region R2 of the substrate 110, the wavelength conversion module 100 may easily conduct heat, and thus exhibits a higher heat resistance and a faster heat conduction, while the conversion efficiency for long-wavelength light beams and the reliability not be compromised. Therefore, the risk of poor conversion efficiency or burnout may be avoided effectively. In detail, the second wavelength conversion material on the second region R2 may closer to the substrate 110, that is, closer to the substrate, so that the problem of poor conversion efficiency or burnout caused from a high temperature may be alleviated. On the other hand, the first color light Y formed from the filter module 230 may be ranged in a wider waveband, and with the arrangement of the first reflective layer 121, the wavelength conversion layer 130 corresponding to the first region R1 of the substrate 110 may be configured to maintain a favorable conversion efficiency for color lights of different wavebands.

As shown in FIG. 1, in the embodiment, the projection device 300 further includes a light homogenizing element 240 located on the transmission path of the illumination beam 70. In the embodiment, the light homogenizing element 240 includes an integration column, but the invention is not limited thereto. In more detail, as shown in FIG. 1, when the illumination beam 70 is transmitted by the illumination system 200 to the light homogenizing element 240, the light homogenizing element 240 may be used to homogenize the illumination beam 70 and transmit the illumination beam 70 to the light valve 310.

In this way, in the wavelength conversion module 100 of the illumination system 200 of the projection device 300, the first reflective layer 121 and the second reflective layer 122 are disposed at different regions distinctively or compositely, so that different reflection structures may be used for various excitation beams of different energy intensities. With such a reflection configuration, deterioration or burnout caused from a high temperature may be effectively avoided, and the conversion efficiency and reliability of the wavelength conversion module 100 may also not be compromised.

In addition, although the first reflective layer 121 and the second reflective layer 122 of the wavelength conversion module 100 are respectively exemplified by a diffuse reflection layer and a specular reflection layer, the invention is not limited thereto. In other embodiments, the first reflective layer 121 and the second reflective layer 122 may both be specular reflection layers. The first reflective layer 121 may include a plurality of first sub-reflective layers, the second reflective layer 122 may also include a plurality of second sub-reflective layers, and the number of the plurality of first sub-reflective layers is different from the number of the plurality of second sub-reflective layers. In the embodiment, it is required that the distance D2 from the top surface of the second reflective layer 122 on the second region R2 of the substrate 110 to the substrate 110 is shorter than the distance D1 from the top surface of the first reflective layer 121 on the first region R1 of the substrate 110 to the substrate 110. In this configuration, the first reflective layer 121 may have an optimal reflection effect for various color lights (e.g., visible light having a wavelength band of 400 nm to 700 nm), and the second reflective layer 122 may have a favorable reflection effect on a long-wavelength light beam.

Figure 3A:
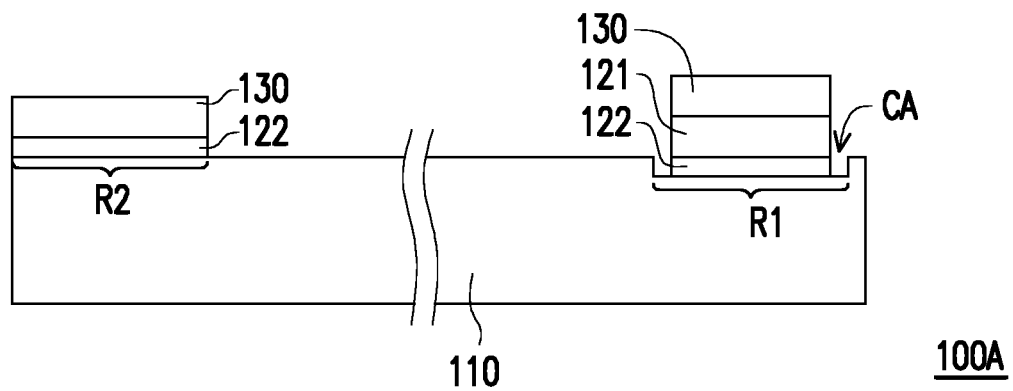
FIG. 3A is a schematically sectional view of another wavelength conversion module of FIG. 1.
Figure 3B:
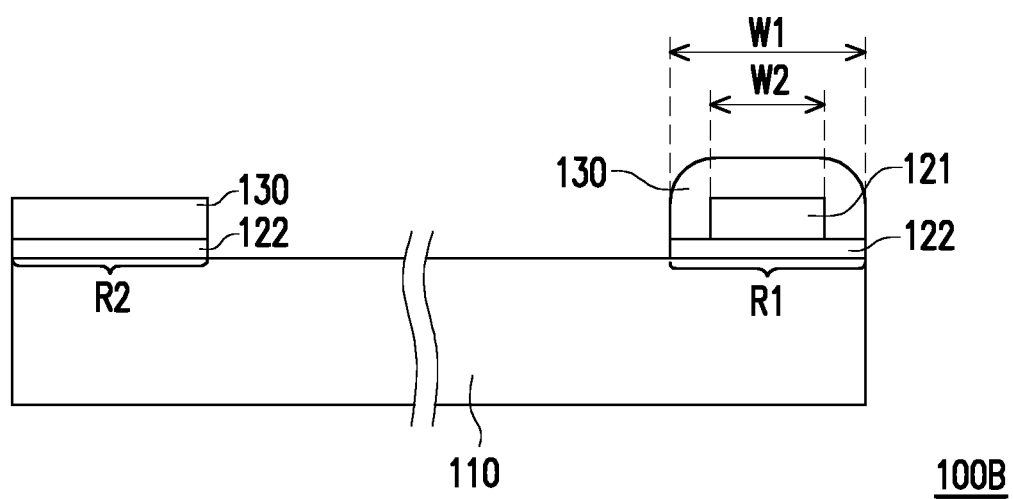
FIG. 3B is a schematically sectional view of another wavelength conversion module of FIG. 1.

FIG. 3A is a schematically sectional view of another example of the wavelength conversion module 100 of FIG. 1. FIG. 3B is a schematically sectional view of still another example of the wavelength conversion module 100 of FIG. 1. Referring to FIG. 3A and FIG. 3B, a wavelength conversion module 100A and a wavelength conversion module 100B are similar to the wavelength conversion module 100 of FIG. 2C, and the differences therebetween may be described as follows. As shown in FIG. 3A, the first region R1 of the substrate 110 of the wavelength conversion module 100A may include a groove CA configured to accommodate the first reflective layer 121. As shown in FIG. 3B, a width W1 of the wavelength conversion layer 130 of the wavelength conversion module 100B across the first region R1 is greater than a width W2 of the first reflective layer 121. Within the first region R1, the wavelength conversion layer 130 may completely cover the first reflective layer 121. The invention does not limit the structure used for accommodating the first reflective layer 121 or the width of the first reflective layer 121.

In this way, in the wavelength conversion module 100A and the wavelength conversion module 100B, the first reflective layer 121 and the second reflective layer 122 are disposed at different regions distinctively or compositely, so that different reflection structures may be used for various excitation beams of different energy intensities. With such a reflection configuration, deterioration or burnout caused from a high temperature may be effectively avoided, and the conversion efficiency and reliability of the wavelength conversion module 100A and the wavelength conversion module 100B may also not be compromised.

Therefore, the wavelength conversion module 100A and the wavelength conversion module 100B may also achieve similar functions to the wavelength conversion module 100 of FIG. 2C, and may have similar effects and advantages to the wavelength conversion module 100. The descriptions may not be repeated hereinafter. Moreover, when the wavelength conversion module 100A and the wavelength conversion module 100B are applied to the illumination system 200 of the projection device 300 of FIG. 1, the effects and advantages of the aforementioned projection device 300 may also be achieved, and the relative descriptions may not be repeated hereinafter.

In the embodiment of FIG. 1, the projection device 300 is exemplified by the penetrative wavelength conversion module 100, but the invention is not limited thereto. In other embodiments, the projection device 300 may also include a reflective wavelength conversion module, and people of ordinary skill in the art may make appropriate changes to an optical path referring to the invention, and similar effects and advantages to the aforementioned projection device 300 may be achieved, but it should still fall within the scope of the invention. Some examples are given below as an illustration.

Figure 4:
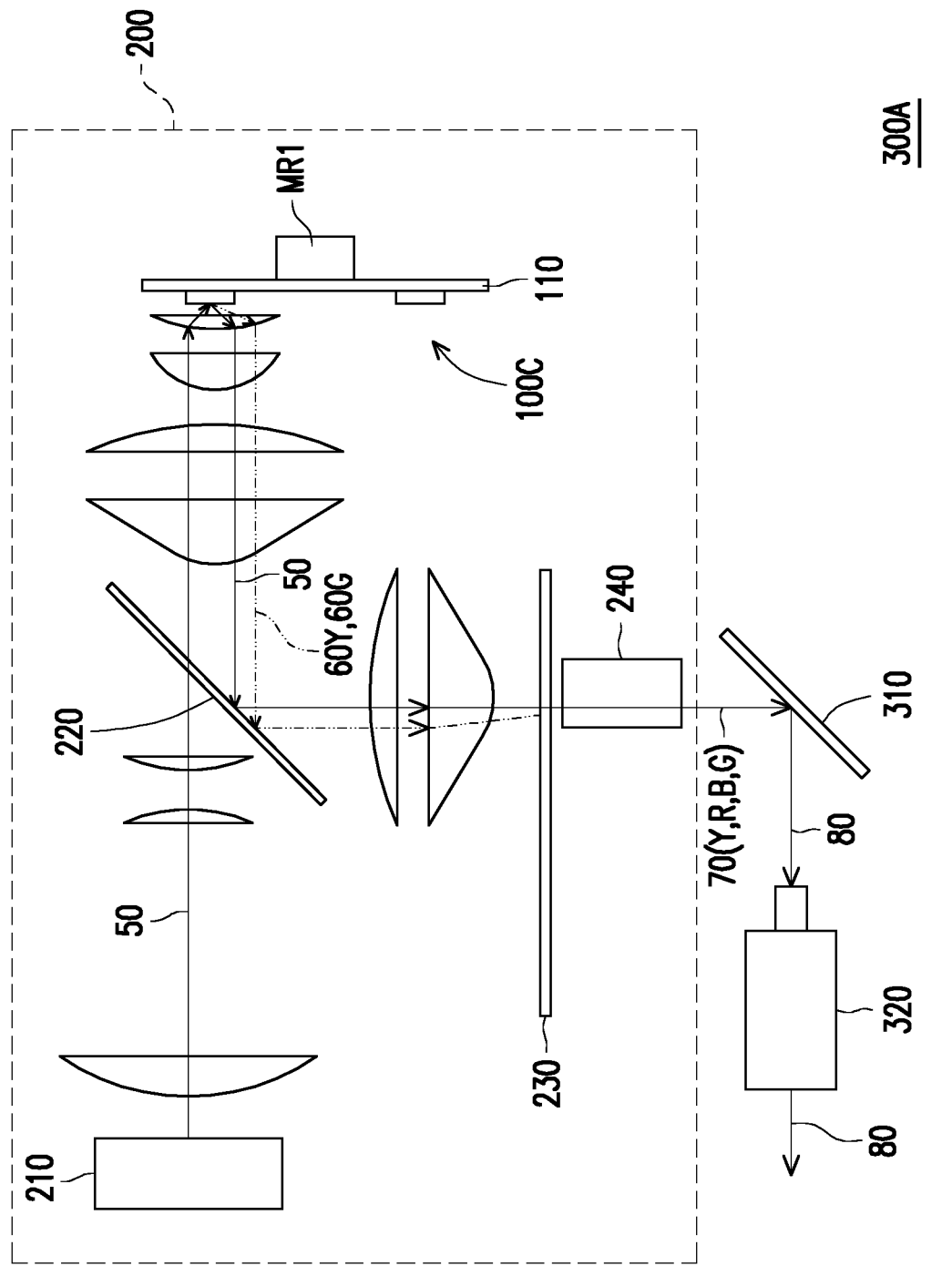
FIG. 4 is a schematically structural view of another projection device according to an embodiment of the invention.

FIG. 4 is a schematically structural view of another projection device 300A according to an embodiment of the invention. As shown in FIG. 4, in the embodiment, the projection device 300A may include a wavelength conversion module 100C. The wavelength conversion module 100C may be similar to the wavelength conversion module 100 with the following difference. The wavelength conversion module 100C is a reflective wavelength conversion module. Therefore, the substrate 110 of the wavelength conversion module 100C may not include a hollowed region. A reflection region may be disposed on the wavelength conversion module 100C to reflect the excitation beam 50.

Specifically, as shown in FIG. 4, in the embodiment, when the reflection region of the wavelength conversion module 100C enters the illumination range of the excitation beam 50, the excitation beam 50 may be reflected by the reflection region, and then guided to the beam splitter 220. The excitation beam 50 may further be reflected to the subsequent filter module 230. On the other hand, in the embodiment, when the first wavelength conversion region WR1 or the second wavelength conversion region WR2 enters the irradiation range of the excitation beam 50, the excitation beam 50 may be converted into the converted beam 60Y or 60G by the first wavelength conversion region WR1 or the second wavelength conversion region WR2. Thereafter, as shown in FIG. 4, the converted beams 60Y, 60G from the wavelength conversion module 100C may be guided to the beam splitter 220 and be reflected to the subsequent filter module 230. Then, the first filter region FR1, the second filter region FR2 and the third filter region FR3 of the filter module 230 enter the illumination range of the converted beams 60Y, 60G correspondingly at different times to respectively form the first color light Y, the second color light R and the fourth color light G. On the other hand, the diffusion region of the filter module 230 may periodically enter the illumination range of the excitation beam 50, and the diffused excitation beam 50 may then be transmitted to the filter module 230 at different times and the third color light B may be formed, thereby forming the subsequent illumination beam 70 and image beam 80.

In this way, the wavelength conversion module 100C employed in the projection device 300A may be similar to the wavelength conversion module 100, similar functions, effects, or advantages may be achieved, so the projection device 300A may also achieve effects and advantages similar to the projection device 300. The relative descriptions may not be repeated hereinafter.

Based on the foregoing, the embodiments of the invention have at least one of the following advantages or effects. In the embodiments of the invention, the first reflective layer and the second reflective layer are disposed at different regions distinctively or compositely, so that different reflection structures may be used for various excitation beams of different energy intensities. With such a reflection configuration, deterioration or burnout caused from a high temperature may be effectively avoided, and the conversion efficiency and reliability of the wavelength conversion module and the projection device may also not be compromised.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A wavelength conversion module, comprising a substrate, a wavelength conversion layer, a first reflective layer, and a second reflective layer, wherein:
    the substrate comprises a first region and a second region,
    the wavelength conversion layer is disposed on the substrate,
    the first reflective layer is disposed on the first region of the substrate, and the first reflective layer is located between the first region of the substrate and the wavelength conversion layer, and
    the second reflective layer is disposed on the second region of the substrate, and the second reflective layer is located between the second region of the substrate and the wavelength conversion layer, and wherein,
    a distance from a top surface of the second reflective layer to the substrate is shorter than a distance from a top surface of the first reflective layer to the substrate,
    wherein a first reflection spectrum of the first reflective layer for a light beam ranging within a wavelength band is different from a second reflection spectrum of the second reflective layer for the light beam ranging within the wavelength band.

2. The wavelength conversion module according to claim 1, wherein the second reflective layer is further disposed on the first region of the substrate, and the second reflective layer is further located between the first region of the substrate and the first reflective layer.

3. The wavelength conversion module according to claim 1, wherein a thickness of the second reflective layer is less than a thickness of the first reflective layer.

4. The wavelength conversion module according to claim 1, wherein the wavelength conversion layer comprises a first wavelength conversion material and a second wavelength conversion material, the first wavelength conversion material is correspondingly disposed on the first region of the substrate, and the second wavelength conversion material is correspondingly disposed on the second region of the substrate.

5. The wavelength conversion module according to claim 4, wherein the first wavelength conversion material is different from the second wavelength conversion material.

6. The wavelength conversion module according to claim 4, wherein the first wavelength conversion material is the same as the second wavelength conversion material.

7. The wavelength conversion module according to claim 1, wherein the first reflective layer is a diffuse reflection layer, and the second reflective layer is a specular reflection layer.

8. The wavelength conversion module according to claim 1, wherein the first reflective layer and the second reflective layer are both specular reflection layers, the first reflective layer comprises a plurality of first sub-reflective layers, the second reflective layer comprises a plurality of second sub-reflective layers, and the number of the plurality of first sub-reflective layers is different from the number of the plurality of second sub-reflective layers.

9. The wavelength conversion module according to claim 1, wherein the first region of the substrate has a groove configured to accommodate the first reflective layer.

10. A wavelength conversion module, comprising a substrate, a wavelength conversion layer, a first reflective layer, and a second reflective layer, wherein:
    the substrate comprises a first region and a second region,
    the wavelength conversion layer is disposed on the substrate,
    the first reflective layer is disposed on the first region of the substrate, and the first reflective layer is located between the first region of the substrate and the wavelength conversion layer, and
    the second reflective layer is disposed on the second region of the substrate, and the second reflective layer is located between the second region of the substrate and the wavelength conversion layer, and wherein,
    a distance from a top surface of the second reflective layer to the substrate is shorter than a distance from a top surface of the first reflective layer to the substrate,
    wherein a width of the wavelength conversion layer across the first region is greater than a width of the first reflective layer, and within the first region, the wavelength conversion layer completely covers the first reflective layer.

11. A wavelength conversion module, comprising a substrate, a wavelength conversion layer, a first reflective layer, and a second reflective layer, wherein:

the substrate comprises a first region and a second region, the wavelength conversion layer is disposed on the substrate, the first reflective layer is disposed on the first region of the substrate, and the first reflective layer is located between the first region of the substrate and the wavelength conversion layer, and the second reflective layer is disposed on the second region of the substrate, and the second reflective layer is located between the second region of the substrate and the wavelength conversion layer, and wherein, a distance from a top surface of the second reflective layer to the substrate is shorter than a distance from a top surface of the first reflective layer to the substrate, wherein the wavelength conversion layer comprises a first wavelength conversion material and a second wavelength conversion material, the first wavelength conversion material is correspondingly disposed on the first region of the substrate, and the second wavelength conversion material is correspondingly disposed on the second region of the substrate, wherein the wavelength conversion layer further comprises a third wavelength conversion material, the substrate further comprises a third region, and the third wavelength conversion material is correspondingly disposed on the third region of the substrate.

12. The wavelength conversion module according to claim 11, wherein the wavelength conversion layer further comprises a passing-through region.

13. A projection device, comprising an illumination system, a light valve and a projection lens, wherein:

the illumination system is configured to provide an illumination beam, and comprises an excitation light source, a wavelength conversion module and a filter module, wherein:

the excitation light source emits an excitation beam, the wavelength conversion module is located on a transmission path of the excitation beam, and configured to convert the excitation beam into at least one converted beam, and the wavelength conversion module comprises a substrate, a wavelength conversion layer, a first reflective layer, and a second reflective layer, wherein:

the substrate comprises a first region and a second region, the wavelength conversion layer is disposed on the substrate, the first reflective layer is disposed on the first region of the substrate, and the first reflective layer is located between the first region of the substrate and the wavelength conversion layer; and the second reflective layer is disposed on the second region of the substrate, and the second reflective layer is located between the second region of the substrate and the wavelength conversion layer, and a distance from a top surface of the second reflective layer to the substrate is shorter than a distance from a top surface of the first reflective layer to the substrate, wherein a first reflection spectrum of the first reflective layer for a light beam ranging within a wavelength band is different from a second reflection spectrum of the second reflective layer for the light beam ranging within the wavelength band, and the filter module is located on a transmission path of the excitation beam and the at least one converted beam, and the illumination beam comprises the excitation beam and the at least one converted beam, the light valve is located on a transmission path of the illumination beam and configured to convert the illumination beam into an image beam, and the projection lens is located on a transmission path of the image beam and configured to project the image beam.

14. The projection device according to claim 13, wherein the second reflective layer is further disposed on the first region of the substrate, and the second reflective layer is further located between the first region of the substrate and the first reflective layer.

15. The projection device according to claim 13, wherein a thickness of the second reflective layer is less than a thickness of the first reflective layer.

16. The projection device according to claim 13, wherein the wavelength conversion layer comprises a first wavelength conversion material and a second wavelength conversion material, the first wavelength conversion material is correspondingly disposed on the first region of the substrate, and the second wavelength conversion material is correspondingly disposed on the second region of the substrate.

17. The projection device according to claim 16, wherein the first wavelength conversion material is different from the second wavelength conversion material.

18. The projection device according to claim 16, wherein the first wavelength conversion material is the same as the second wavelength conversion material.

19. The projection device according to claim 13, wherein the first reflective layer is a diffuse reflection layer, and the second reflective layer is a specular reflection layer.

20. The projection device according to claim 13, wherein the first reflective layer and the second reflective layer are both specular reflection layers, the first reflective layer comprises a plurality of first sub-reflective layers, the second reflective layer comprises a plurality of second sub-reflective layers, and the number of the plurality of first sub-reflective layers is different from the number of the plurality of second sub-reflective layers.

21. The projection device according to claim 13, wherein the first region of the substrate has a groove configured to accommodate the first reflective layer.

22. The projection device according to claim 13, wherein a width of the wavelength conversion layer across the first region is greater than a width of the first reflective layer, and within the first region, the wavelength conversion layer completely covers the first reflective layer.

23. The projection device according to claim 16, wherein the wavelength conversion layer further comprises a third wavelength conversion material, the substrate further comprises a third region, and the third wavelength conversion material is correspondingly disposed on the third region of the substrate.

24. The projection device according to claim 23, wherein the wavelength conversion layer further comprises a passing-through region.

25. The projection device according to claim 23, wherein the filter module comprises a first filter region, a second filter region, a third filter region, and a diffusion region, wherein the at least one converted beam from the first wavelength conversion material passes through the first filter region and a first color light beam is formed, the at least one converted beam from the second wavelength conversion material passes through the second filter region and a second color light beam is formed,
the excitation beam passes through the diffusion region and a third color light beam is formed, and
the at least one converted beam from the third wavelength conversion material passes through the third filter region and a fourth color light beam is formed.

\* \* \* \* \*